United States Patent

Castellani et al.

(10) Patent No.: US 6,610,401 B2
(45) Date of Patent: Aug. 26, 2003

(54) CABLES WITH A RECYCLABLE COATING

(75) Inventors: Luca Castellani, Corsico (IT); Cristiana Scelza, Angellara di Vallo Della Lucania (IT); Enrico Albizzati, Lesa (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 9 days.

(21) Appl. No.: 09/894,779

(22) Filed: Jun. 28, 2001

(65) Prior Publication Data

US 2002/0039653 A1 Apr. 4, 2002

Related U.S. Application Data

(63) Continuation of application No. PCT/EP99/10296, filed on Dec. 21, 1999.
(60) Provisional application No. 60/118,804, filed on Feb. 4, 1999.

(30) Foreign Application Priority Data

Dec. 30, 1998 (EP) .............................. 98830800

(51) Int. Cl.⁷ .............................. D02G 3/00; H01B 9/02
(52) U.S. Cl. ................ 428/379; 428/375; 174/110 PM; 174/110 SR; 174/120 SR
(58) Field of Search ................................. 428/375, 379, 428/383; 174/110 PM, 110 SR, 120 SR, 120 SC; 525/232, 323, 240

(56) References Cited

U.S. PATENT DOCUMENTS

| | | | |
|---|---|---|---|
| 5,286,564 A | | 2/1994 | Cecchin et al. |
| 5,302,454 A | * | 4/1994 | Cecchin et al. ............. 428/402 |
| 5,468,807 A | * | 11/1995 | Tsurutani et al. ........... 525/240 |
| 6,001,933 A | * | 12/1999 | Tsuruoka et al. ........... 525/232 |
| 6,100,333 A | * | 8/2000 | Collina et al. ............... 525/191 |
| 6,156,846 A | * | 12/2000 | Tsuruoka et al. ........... 525/240 |
| 6,162,548 A | * | 12/2000 | Castellani et al. .......... 428/500 |
| 6,255,399 B1 | * | 7/2001 | Castellani et al. .......... 525/232 |
| 6,372,344 B1 | * | 4/2002 | Castellani et al. .......... 428/379 |
| 6,410,651 B1 | * | 6/2002 | Castellani et al. .......... 525/232 |
| 2002/0039653 A1 | * | 4/2002 | Castellani et al. .......... 428/375 |

FOREIGN PATENT DOCUMENTS

| | | |
|---|---|---|
| EP | 0 373 660 A2 | 6/1990 |
| EP | 0 400 333 A2 | 12/1990 |
| EP | 0 472 946 A2 | 3/1992 |
| EP | 0 527 589 A1 | 2/1993 |
| EP | 0 893 801 A1 | 1/1999 |
| WO | WO 96/23311 | 8/1996 |

* cited by examiner

Primary Examiner—Cynthia H. Kelly
Assistant Examiner—J. M. Gray
(74) Attorney, Agent, or Firm—Finnegan, Henderson, Farabow, Garrett & Dunner, L.L.P.

(57) ABSTRACT

Cable, in particular for medium-voltage or high-voltage electrical power transmission or distribution, for telecommunications or for data transmission, comprising a conductor and at least one coating layer based on a non-crosslinked polymer material comprising a thermoplastic reactor elastomer with an ethylene-based elastomeric phase co-polymerized with an α-olefin and a propylene-based thermoplastic phase, in which the said elastomeric phase in the said thermoplastic reactor elastomer is at least 45% by weight relative to the total weight of the thermoplastic reactor elastomer, and the said thermoplastic reactor elastomer has value of enthalpy of fusion of peaks present below 130° C. and attributable to polyethylene sequences, such as HIFAX® KS080.

13 Claims, 5 Drawing Sheets

CABLES WITH A RECYCLABLE COATING

CROSS REFERENCE TO RELATED APPLICATIONS

Figure 1:
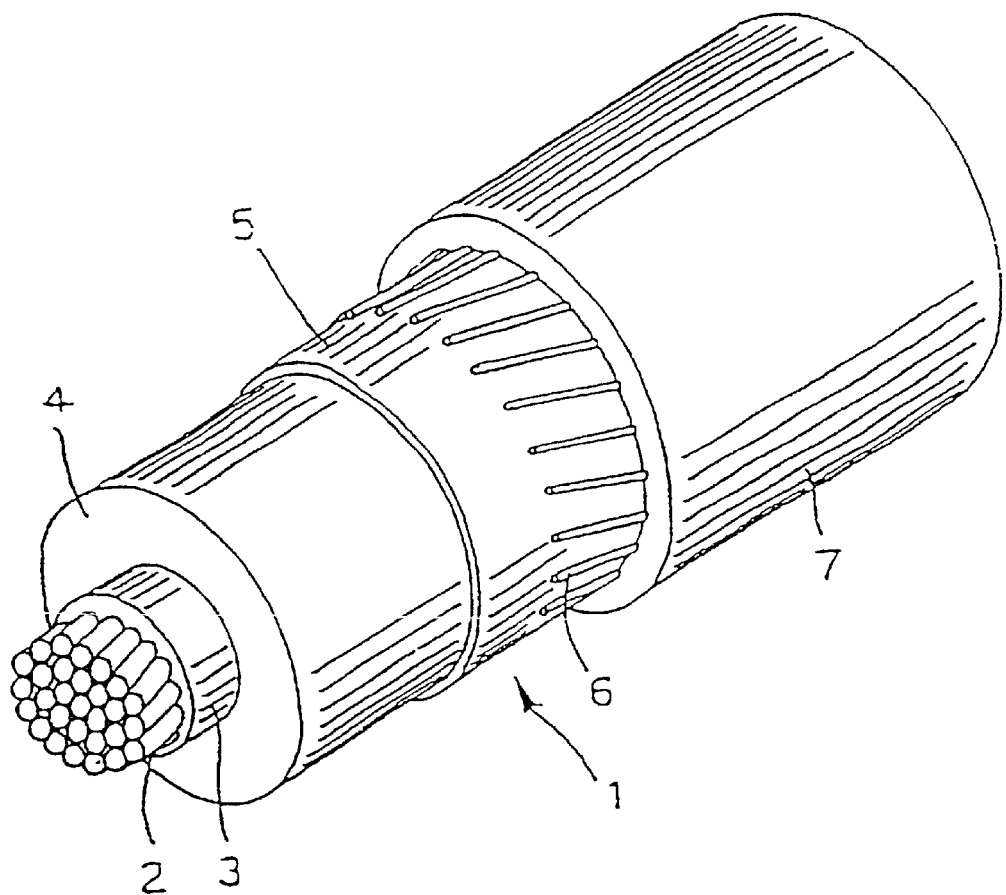

This application is a continuation of International Application No. PCT/EP99/10296, filed Dec. 21, 1999, which is incorporated by reference herein and claims the priority of EP98830800.3, filed Dec. 30, 1998, and the benefit of U.S. Provisional application No. 60/118,804, filed Feb. 4, 1999, which is incorporated by reference herein.

The present invention relates to cables, in particular for medium-voltage or high-voltage electrical power transmission or distribution, for telecommunications or for data transmission, as well as combined power/telecommunications cables, in which at least one coating layer consists of a halogen-free recyclable material which has high-performance mechanical and electrical properties. There is currently a great need for products which are highly environment-friendly, formed of materials which are not only harmless to the environment both during production and during use, but are also easy to recycle at the end of their life. However, the use of environment-friendly materials is highly conditioned by the requirements for keeping their costs within acceptable limits and at the same time ensuring satisfactory performance levels under the most common conditions of use, or even better performance than those of conventional materials. in the cables sector, in particular medium-voltage or high-voltage electrical power transmission or distribution cables, the various coatings which surround the conductor usually consist of crosslinked polymer material, in particular of polyethylene or ethylene copolymers suitably crosslinked during the extrusion phase. The reason for this is that these crosslinked materials maintain a high degree of flexibility and satisfactory mechanical properties even under hot conditions in continuous use and/or under conditions of current overload. However, it is well known that crosslinked materials are not recyclable and that, at the end of their life, they can only be disposed of by incineration. In addition, in certain cases the outer protective sheath is formed of polyvinyl chloride (PVC) which is difficulty to separate by conventional methods (for example by density differences in water)—from crosslinked polyolefins containing inorganic fillers (for example ethylene/propylene rubbers containing inorganic fillers), nor can it be incinerated just as it is, by combustion, since this generates highly toxic chlorinated products.

Patent application WO 96/23311 describes a low-voltage high-current cable in which the insulating coating, the inner sheath and the outer sheath are made of the same non-crosslinked polymer material which is coloured black by the addition of carbon black. Using the same material would not require the separation of the abovementioned components in a recycling process. When temperatures below 70° C. are used, a polyethylene with a density of between 0.92 and 0.94 g/cm$^2$ and a Shore D hardness $\geq 42$ is proposed as polymer material for the insulating coating, the inner sheath and the outer sheath. The use of thermoplastic elastomers consisting of two-phase mixtures of polypropylene with an ethylene/propylene co- or terpolymer (EPR or EPDM rubber) is proposed in the case of a maximum working temperature of 90° C. Within the latter class of polymers, mention is specifically made of the commercial products Santoprene® from Monsanto (polypropylene-based thermoplastic elastomer) and Novolen® from BASF (heterogeneous propylene copolymers obtained in a reactor and having an ethylene/propylene elastomeric phase content of greater than 25% by weight, for example 43% by weight of ethylene/propylene rubber, such as Novolen® 2912 HX from BASF). The Applicant has observed that the technical problem of obtaining a recyclable polymer material for coating electrical cables, in particular medium- or high-voltage cables, which has the desired combination of electrical and mechanical properties can be solved by using a heterogeneous copolymer comprising an ethylene-based elastomeric phase copolymerized with an α-olefin and a propylene-based thermoplastic phase, characterized in that the elastomeric phase is at least 45% by weight relative to the total weight of the heterogeneous copolymer and in that this copolymer is essentially free of crystallinity deriving from polyethylene sequences. In point of fact, it has been suggested that a large amount of elastomeric phase combined with a substantial absence of crystalline polyethylenic sequences gives, on the one hand, the desired mechanical properties for an electrical cable, and in particular a breaking load value of greater than 12 MPa (measured according to CEI standard 20–34 § 5.1), and, on the other hand, excellent electrical insulation properties, in particular low dielectric losses, even under hot conditions and in particular at the maximum working temperature of the cable, with values for the tangent of the angle of loss (tan delta) at 90° C. (measured according to ASTM standard D150) of less than $5 \times 10^4$. In a first aspect thereof, the present invention thus relates to a cable comprising a conductor and at least one coating layer based on a non-crosslinked polymer material comprising a heterogeneous copolymer with an ethylene-based elastomeric phase copolymerized with an α-olefin and a propylene-based thermoplastic phase, characterized in that the said elastomeric phase in the said heterogeneous copolymer is at least 45% by weight relative to the total weight of the heterogeneous copolymer, and in that the said heterogeneous copolymer is essentially free of crystallinity deriving from polyethylene sequences.

According to another aspect, the invention relates to a cable comprising a conductor and at least one coating layer, in which the said coating layer has electrical insulating properties and is based on a non-crosslinked polymer material comprising a heterogeneous copolymer as defined above.

According to a further aspect, the invention relates to a cable comprising a conductor and at least one coating layer, in which the said coating layer has semiconductive properties and is based on a non-crosslinked polymer material comprising a heterogeneous copolymer as defined above.

According to a further aspect, the invention relates to a cable comprising a conductor and at least one coating layer, in which the said coating layer functions as an outer protective sheath and is based on a non-crosslinked polymer material comprising a heterogeneous copolymer as defined above.

According to a further aspect, the invention relates to a cable comprising a conductor and at least one coating layer based on a non-crosslinked polymer material, in which at least 70%, preferably at least 90%, by weight of the said non-crosslinked polymer material consists of a heterogeneous copolymer as defined above.

For the purposes of the present description and the claims which follow, the expression "heterogeneous copolymer comprising an ethylene-based elastomeric phase copolymerized with an α-olefin and a propylene-based thermoplastic phase" means a thermoplastic elastomer obtained by sequential copolymerization of: (a) propylene, optionally containing small amounts of at least one olefinic comonomer chosen from ethylene and α-olefins other than propylene; and then: (b) a mixture of ethylene with an α-olefin, in particular propylene, and optionally with small proportions of a diene. This class of products is also commonly known as "thermoplastic reactor elastomers".

Throughout the present description and the claims which follow, the expression "heterogeneous copolymer essentially free of crystallinity deriving from polyethylenic sequences" means that the heterogeneous copolymer subjected to differential scanning calorimetry (DSC) analysis does not show any appreciable melting peaks attributable to a crystalline polyethylenic phase, i.e. to $(CH_2)_n$ sequences of crystalline type. In quantitative terms, this means that the value of the enthalpy of fusion of peaks present below 130° C. and attributable to polyethylenic sequences is generally less than 3 J/g: preferably, it is substantially zero.

Alternatively, the substantial absence of crystallinity due to polyethylenic sequences can be ascertained by extraction of the elastomeric (amorphous) phase by means of a suitable organic solvent (for example xylene at 135° C. at reflux for 20 min.) and analysis of the residue formed by the crystalline phase, for example by means of X-ray diffractometry. The substantial absence of reflection typical of crystalline polyethylene at the angle 2θ=21.5° (with radiation of the copper) indicates that the heterogeneous copolymer is essentially free of crystalline polethylenic sequences.

The amount of elastomeric phase present in the heterogeneous copolymer can be determined by known techniques, for example by extracting the elastomeric (amorphous) phase with a suitable organic solvent (in particular xylene at 135° C. at reflux for 20 min): the amount of elastomeric phase is calculated as the difference between the initial weight of the sample and the weight of the dried residue.

In accordance with the present invention, the use of a heterogeneous copolymer as defined above gives a flexible recyclable coating with excellent mechanical properties, in terms of both breaking load and elongation at break. In particular, it is possible to obtain mechanical performance levels under hot conditions, i.e. at 90° C. for continuous use and at 130° C. in the case of a current overload, which are comparable with the typical performance levels of the polyethylene-based crosslinked coatings currently marketed, thereby making the abovementioned heterogeneous copolymer suitable for coating not only low-voltage electrical cables, but preferably medium-voltage or high-voltage cables.

For the purposes of the present invention, the term "low voltage" generally means a voltage of less than 5 kV, the term "medium voltage" means a voltage of between 5 and 35 kV, while "high voltages" are considered to be voltages above 35 kV.

With particular reference to medium-voltage and high-voltage cables, the heterogeneous copolymers as defined above can be used advantageously to prepare an insulating layer. The reason for this is that, as mentioned above, these copolymers have high-performance mechanical properties both at room temperature and under hot conditions, and moreover have adequate electrical properties, with low tan delta and permittivity values and thus low dielectric losses in alternating current, which, as is known, are proportional to the product between tan delta and permittivity.

In addition, the same heterogeneous copolymers defined above can be used advantageously to prepare at least one inner or outer semiconductive layer. The reason for this is that the addition to these copolymers of fillers capable of imparting semiconductive properties, for example carbon black, does not substantially challenge the mechanical properties, which are maintained well below the values considered as suitable for semiconductive layers. The possibility of using the same type of polymer material both for the insulating layer and for the semiconductive layers is particularly advantageous in the production of medium-voltage or high-voltage cables, since it ensures optimal adhesion between adjacent layers and thus better electrical behaviour, especially at the interface between the insulating layer and the inner semiconductive layer where the electrical field is stronger and thus the risk of partial discharges are greater.

Heterogeneous copolymers whose structural properties and relevant physicochemical properties vary within a wide range are commercially available, for example under the tradename Hifax® from Montell. However, by means of the teaching provided in the present description, a person skilled in the art will readily be able to select the heterogeneous copolymers which are most suitable for carrying out the present invention.

Generally, the said heterogeneous copolymers are prepared by sequential copolymerization of: (a) propylene, optionally containing at least one olefinic comonomer chosen from ethylene and α-olefins other than propylene; and then of: (b) a mixture of ethylene with an α-olefin, in particular propylene, and optionally a diene. The copolymerization is usually carried out in the presence of Ziegler-Natta catalysts based on halogenated titanium compounds supported on magnesium chloride. Details regarding the preparation of these copolymers are given, for example, in EP-A-0,400,333, EP-A-0,373,660 and U.S. Pat. No. 5,286,564.

The term "α-olefin" refers to an olefin of formula $CH_2=CH—R$, where R is a linear or branched alkyl containing from 1 to 10 carbon atoms. The said α-olefin can be chosen, for example, from: propylene, 1-butene, 1-pentene, 1-hexene, 1-octene, 1-dodecene and the like.

The thermoplastic phase of the heterogeneous copolymer, mainly produced during the abovementioned phase (a) of the process, consists of a propylene homopolymer or a crystalline copolymer of propylene with an olefinic comonomer chosen from ethylene and α-olefins other than propylene. Preferably, the olefinic comonomer is ethylene. The amount of olefinic comonomer is preferably less than 10 mol % relative to the total number of moles of the thermoplastic phase.

As mentioned above, the elastomeric phase of the heterogeneous copolymer, mainly produced during the abovementioned phase (b) of the process, is at least 45% by weight, preferably at least 55% by weight and even more preferably at least 60% by weight, relative to the total weight of the heterogeneous copolymer, and consists of an elastomeric copolymer of ethylene with an α-olefin and optionally with a diene. The said cc-olefin is preferably propylene. The diene optionally present as comonomer generally contains from 4 to 20 carbon atoms and is preferably chosen from: linear (non-)conjugated diolefins, for example 1,3-butadiene, 1,4-hexadiene, 1,6-octadiene and the like; monocyclic or polycyclic dienes, for example 1,4-cyclohexadiene, 5-ethylidene-2-norbornene, 5-methylene-2-norbornene and the like. The composition of the elastomeric phase is generally as follows: from 15 to 85 mol % of ethylene, from 15 to 85 mol % of α-olefin, from 0 to 5 mol % of a diene.

In a preferred embodiment, the elastomeric phase consists of an elastomeric copolymer of ethylene and propylene which is rich in propylene units, this copolymer in particular having the following composition: from 15 to 50% by weight, more preferably from 20 to 40% by weight, of ethylene, and from 50 to 85% by weight, more preferably from 60 to 80% by weight, of propylene, relative to the weight of the elastomeric phase.

The amount of propylene units in the elastomeric phase can be determined by extraction of the elastomeric phase as described above (for example with xylene at 135° C. at reflux for 20 min), followed by analysis of the dried extract according to known techniques, for example by infrared (IR) spectroscopy.

In one embodiment of the present invention, the said at least one coating layer based on a non-crosslinked polymer material comprises a mixture of a heterogeneous copolymer as defined above with a thermoplastic polymer which has a melting point of greater than 160° C. This thermoplastic polymer is preferably chosen from crystalline propylene homopolymers and copolymers with a enthalpy of fusion of greater than 75 J/g, preferably greater than 85 J/g. The presence of this thermoplastic polymer makes it possible to increase the heat-pressure resistance of the cable coating, and is particularly preferred when the thermoplastic phase of the heterogeneous copolymer used has a melting point of less than 150° C. The amount of thermoplastic polymer to be used mixed with the heterogeneous copolymer according to the present invention is generally between 10 and 50% by weight, preferably between 20 and 40% by weight, relative to the total weight of the said mixture.

Other conventional components such as antioxidants, fillers, processing co-adjuvants, lubricants, pigments, water-free retardant additives, voltage stabilizer additives and the like can be added to the base polymer material consisting of a heterogeneous copolymer as defined above, optionally mixed with the said thermoplastic polymer. When it is intended to prepare a semiconductive layer, the polymer material is preferably filled with carbon black, in an amount such as to give this material semiconductive properties (i.e. so as to obtain a resistivity of less than 5 ohm.m at room temperature). This amount is generally between 5 and 80% by weight, preferably between 10 and 50% by weight, relative to the total weight of the compound.

Conventional antioxidants which are suitable for this purpose are, for example: polymerized trimethyidihydroquinoline, 4,4'-thiobis(3-methyl-6-tert-butyl)phenol; pentaerithrityl tetra[3-(3,5-di-tert-butyl-4-hydroxyphenyl)propionate], 2,2'-thiodiethylene bis[3-(3,5-di-tert-butyl-4-hydroxyphenyl)propionate] and the like, or mixtures thereof.

Other fillers which can be used in the present invention include, for example: calcium carbonate, calcined kaolin, talc and the like, or mixtures thereof. Processing co-adjuvants usually added to the polymer base are, for example, calcium stearate, zinc stearate, stearic acid, paraffin wax, silicone rubbers and the like, or mixtures thereof.

Figure 2:
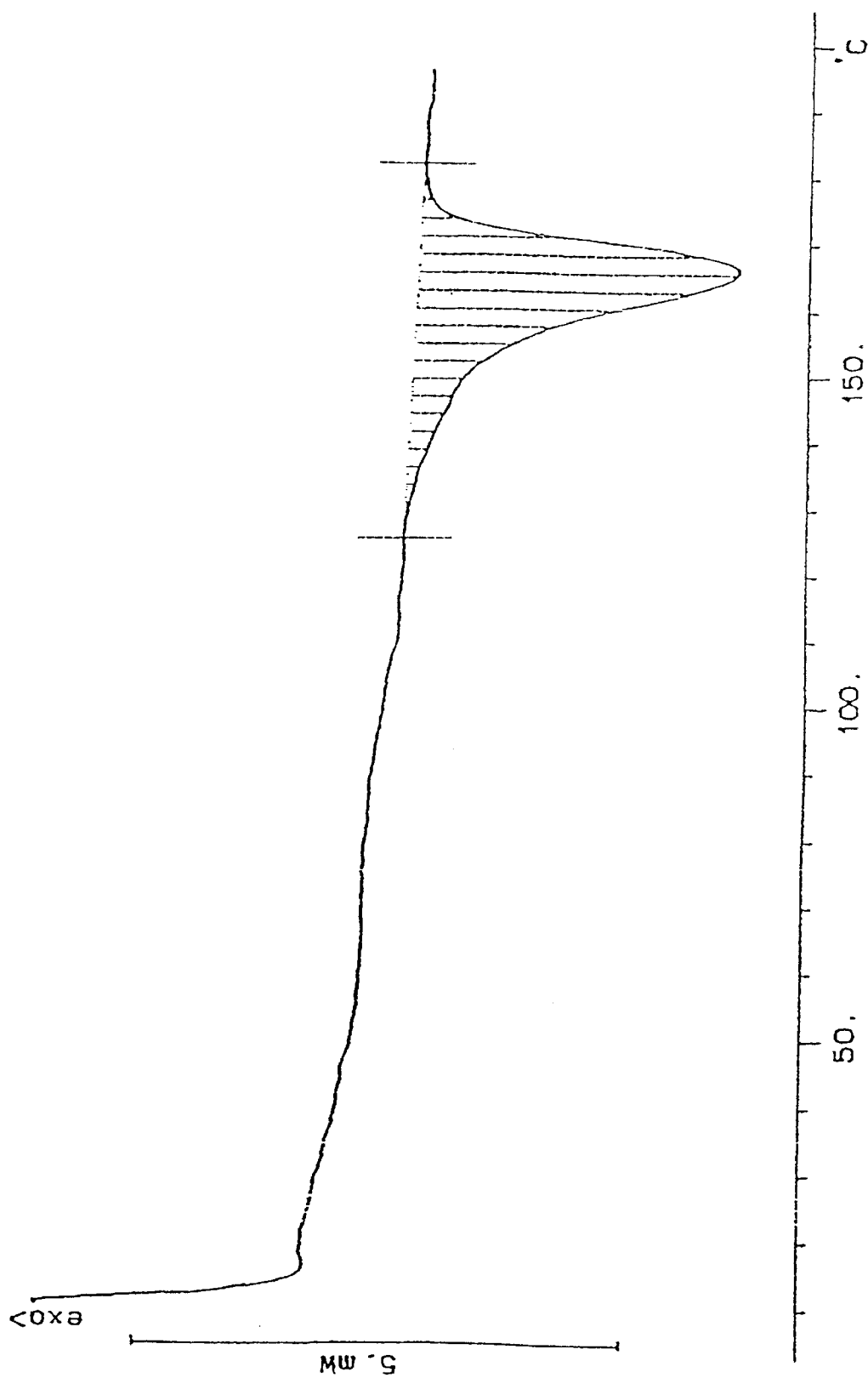
Figure 3:
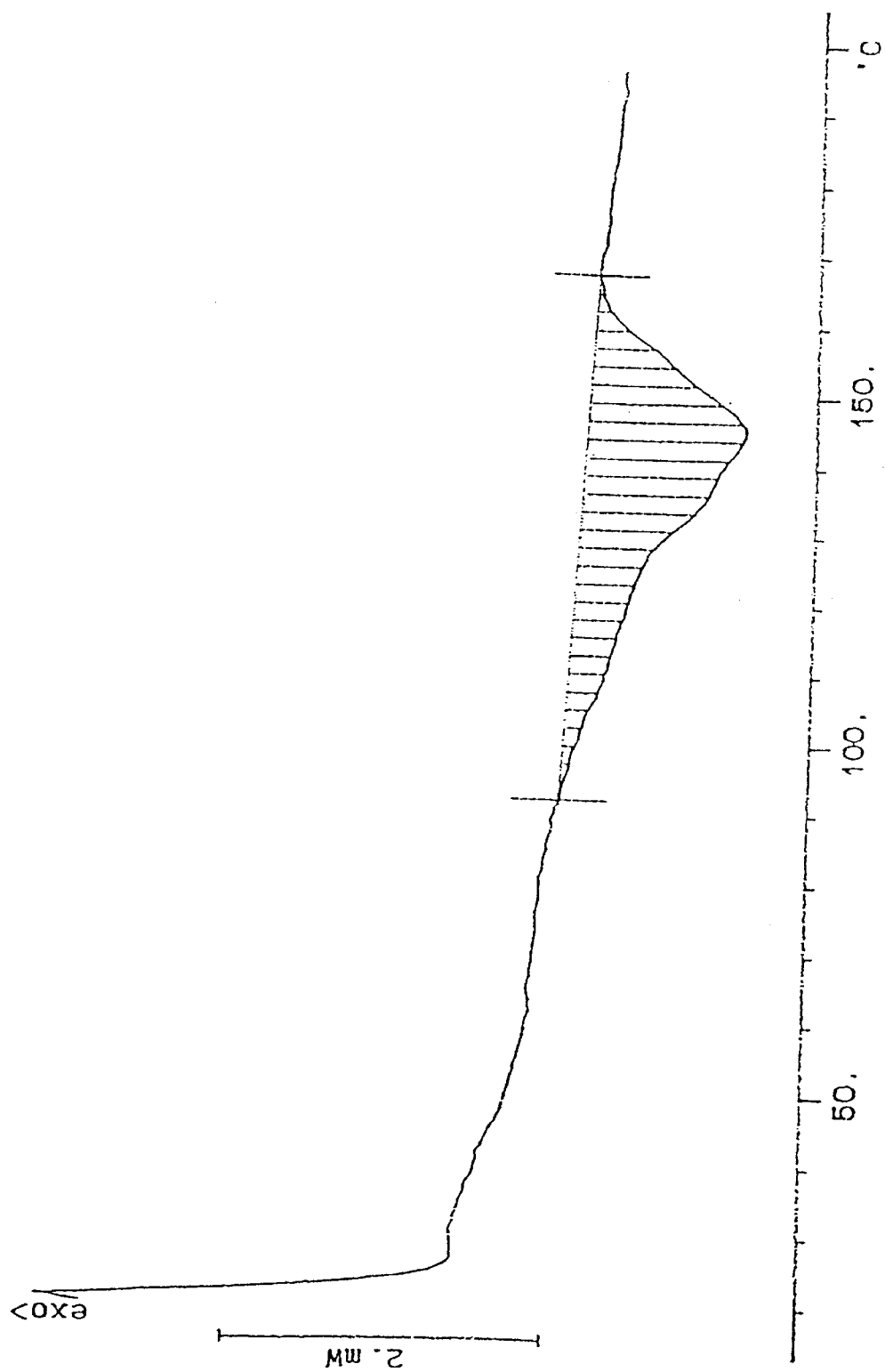
Figure 4:
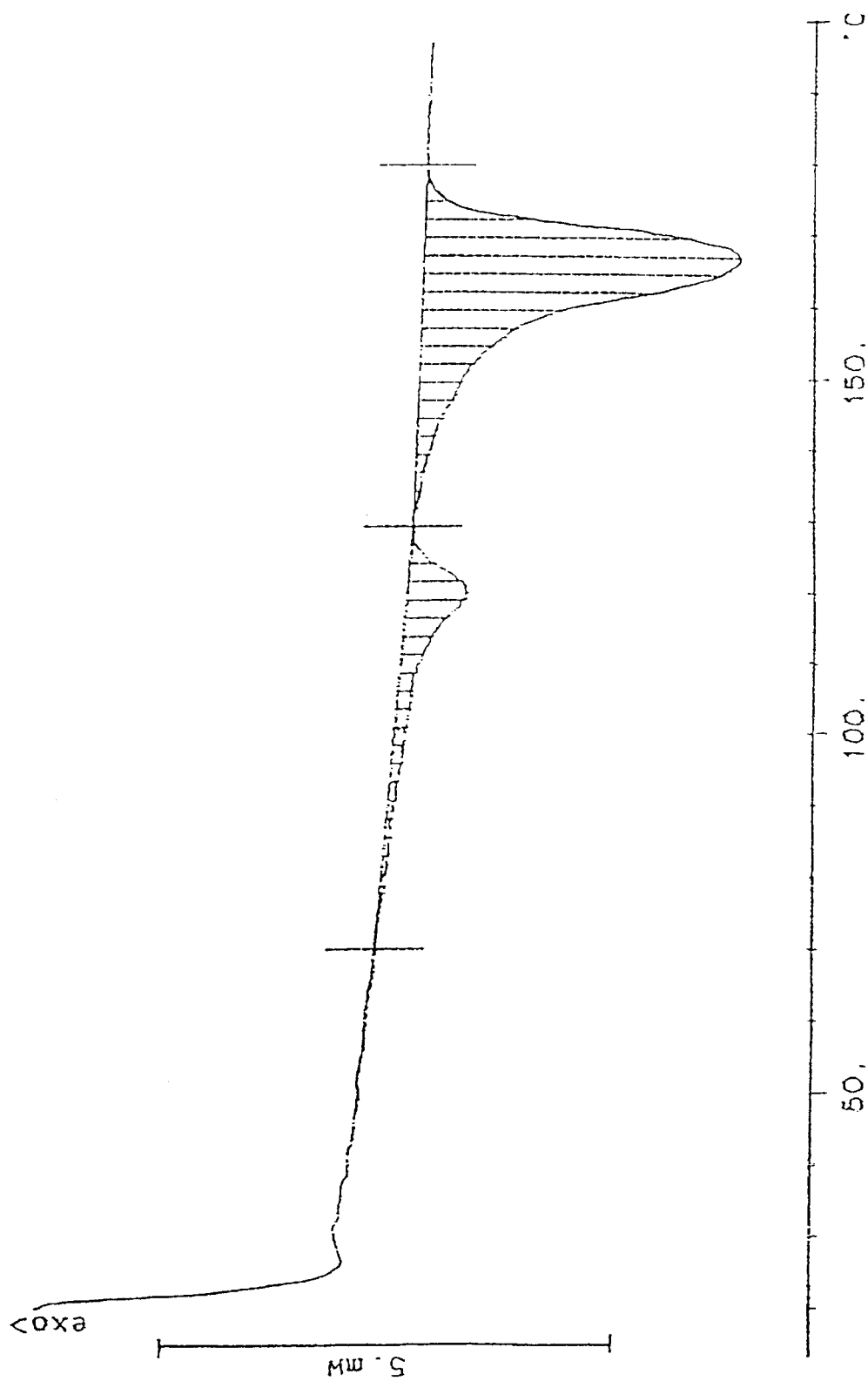
Figure 5:
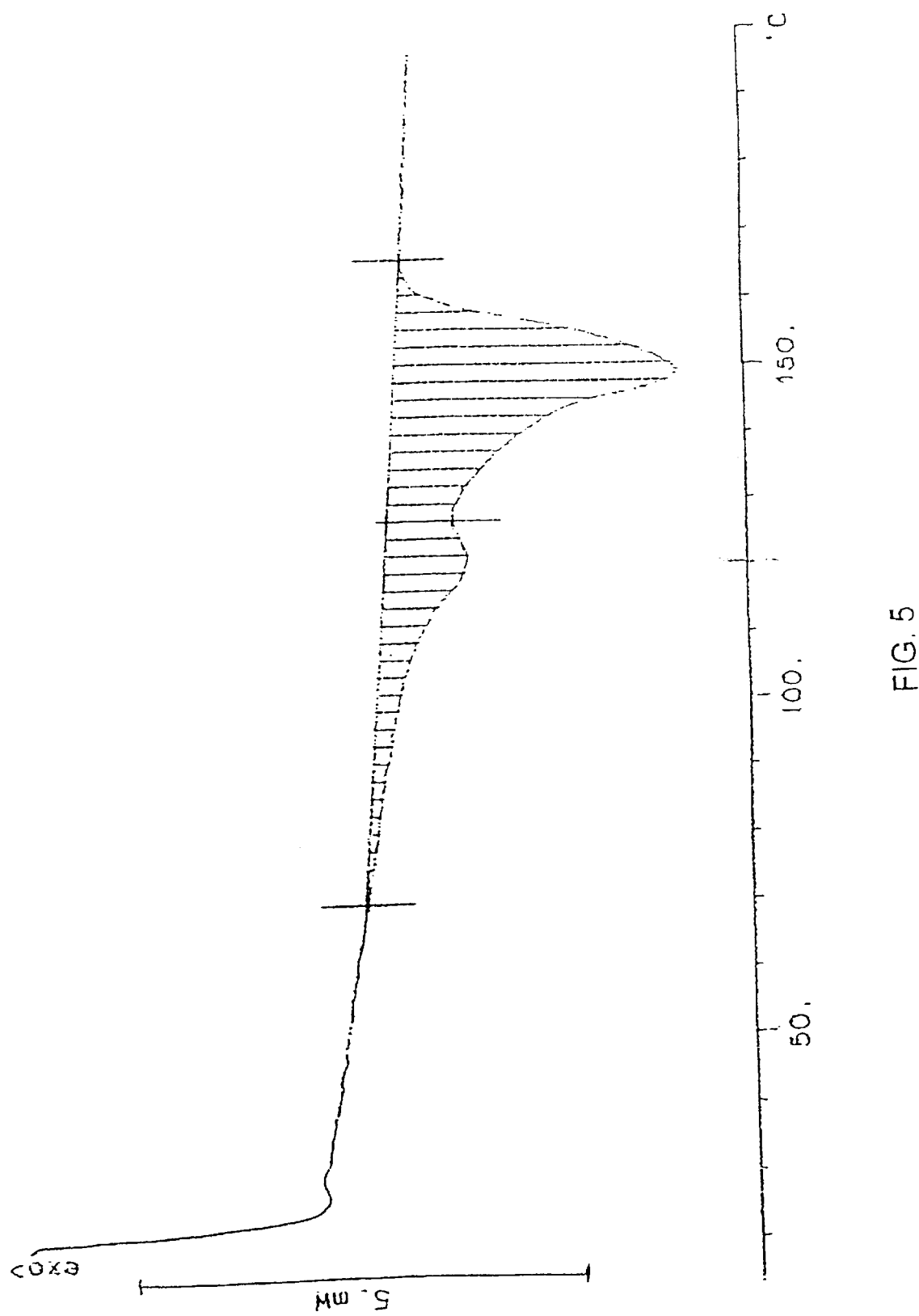

Further details will be illustrated in the detailed description which follows, with reference to the appended drawings, in which:

FIG. 1 is a perspective view of an electrical cable, which is particularly suitable for medium voltages, according to the present invention;

FIGS. 2 and 3 show the DSC curves of two heterogeneous copolymers according to the present invention (copolymers 1 and 2 respectively);

FIGS. 4 and 5 show the DSC curves of two comparative heterogeneous copolymers (copolymers 3 and 4 respectively).

In FIG. 1, the electrical cable 1 comprises a conductor 2; an inner layer 3 with semiconductive properties; an intermediate layer 4 with insulating properties; an outer layer 5 with semiconductive properties; a screen 6; and an outer sheath 7.

The conductor 2 generally consists of metal wires, preferably made of copper or aluminium, which are braided together according to conventional techniques.

At least one of the layers 3, 4 and 5, and preferably at least the insulating layer 4, comprises, as non-crosslinked base polymer material, a heterogeneous copolymer as defined above, which is essentially free of crystallinity attributable to polyethylene sequences and in which the elastomeric phase is at least 45% relative to the total weight of the said heterogeneous copolymer.

In a preferred embodiment of the present invention, all of the insulating and semiconductive layers 3, 4 and 5 comprise, as non-crosslinked base polymer material, a heterogeneous copolymer as defined above.

A screen 6 consisting, for example, of helically wound metal wires or strips is preferably placed around the outer semiconductive layer 5. Alternatively, the screen 6 can consist of a continuous tubular component made of metal, preferably aluminium or copper. The screen 6 is then usually coated with a sheath 7 consisting of a thermoplastic material such as polyvinyl chloride (PVC), non-crosslinked polyethylene (PE) or, preferably, a heterogeneous copolymer as defined above.

FIG. 1 shows only one possible type of cable according to the present invention. Needless to say, appropriate changes known in the art may be made to this embodiment without thereby departing from the scope of the present invention. In particular, telecommunications cables or data transmission cables, or alternatively combined power/telecommunications cables, can be made by using a heterogeneous copolymer as defined above in at least one of the coatings made of plastic material.

A number of properties of heterogeneous copolymers according to the present invention (copolymers 1 and 2) and of comparative heterogeneous copolymers (copolymers 3 and 4) are given in Table 1.

The melt flow index (MFI) was measured at 230° C. and 21.6 N according to ASTM standard D 1238/L.

The enthalpy of fusion deriving from polypropylene sequences (PP enthalpy) and the enthalpy of fusion deriving from polyethylene sequences (PE enthalpy) was measured using Mettler DSC equipment (second fusion value) with a scan speed of 10° C./min (instrument head: DSC 30 type; microprocessor: PC 11 type; software: Mettler Graphware TA72AT.1). The DSC curves for the four heterogeneous copolymers of Table 1 are illustrated in FIGS. 2–5. It should be noted that the DSC curve for copolymer 2 has a single melting peak relative to the polypropylene phase centred on about 145° C., with a highly pronounced "tail" extending below 130° C., which can be attributed to the presence of a polypropylene phase of low crystallinity presumably due to the presence of short sequences of propylene units interrupted by ethylene units.

The percentage of elastomeric phase was determined by extraction with xylene at 135° C. at reflux for 20 min., calculated as the difference between the initial weight of the sample and the weight of the dried residue.

The propylene content in the elastomeric phase was determined by IR spectroscopic analysis of the polymer extracted as described above and dried by evaporation of the solvent. By means of suitable calibration curves, the propylene content is determined as the ratio between the intensity of the bands at 4377 and 4255 cm$^{-1}$.

TABLE 1

| Thermoplastic elastomer | MFI (dg/min.) | PP enthalpy (J/g) | PE enthalpy (J/g) | Elastomeric phase (% by weight) | Propylene in the elastomeric phase (% by weight) |
|---|---|---|---|---|---|
| Cop. 1 | 0.8 | 32.0 | 0 | 60 | 72 |
| Cop. 2 | 0.6 | 23.8 | 0 | 65 | 72 |
| Cop. 3(*) | 0.9 | 35.4 | 7.3 | 55 | 41 |
| Cop. 4(*) | 7.5 | 42.8 | 15.4 | 48 | 40 |

(*)Comparative
Cop. 1: Hifax ® KS080 from Montell;
Cop. 2: Hifax ® CA10A from Montell
Cop. 3: Hifax ® CA12A from Montell
Cop. 4: Hifax ® CA43A from Montell.

The tan delta values at 20° C. and 90° C. and the permittivity values at 20° C., with a gradient of 1 kV/mm at 50 Hz, were measured according to ASTM standard D150 on the heterogeneous copolymers Cop. 1–3, moulded at 195° C. with preheating for 15 min so as to obtain plates 1 mm thick. The results are given in Table 2.

TABLE 2

| Product | tan delta at 20° C. | tan delta at 90° C. | Relative permittivity at 20° C. |
|---|---|---|---|
| Cop. 1 | 3.0 × 10$^{-4}$ | 3.0 × 10$^{-4}$ | 2.30 |
| Cop. 2 | 1.0 × 10$^{-4}$ | 2.0 × 10$^{-4}$ | 2.27 |
| Cop. 3(*) | 3.0 × 10$^{-4}$ | 2.1 × 10$^{-3}$ | 2.36 |

(*)comparative

As can be seen, the heterogeneous copolymers which can be used as insulating coating in the cables according to the present invention show tan-delta and relative permittivity values, and consequently dielectric losses in alternating current, which are substantially lower than those of the comparative heterogeneous copolymers.

The heterogeneous copolymers Cop. 1 and Cop. 3 were used to prepare the compositions given in Table 3 (Examples 1–4). These compositions were prepared using a 1.6-liter Banbury mixer with volume-based filling coefficient of about 75%. Plates 1 mm thick were prepared by compression moulding of the compositions thus obtained at 190–195° C. and 200 bar after preheating for 10 minutes at the same temperature. Punch samples were obtained from these plates, on which samples were measured the breaking load (B.L.) and the elongation at break (E.B.) according to CEI standard 20–34 § 5.1, using an Instron machine and a pulling speed of the clamps equal to 50 mm/min. The results are given in Table 3.

The compounds of Examples 1 and 3 and those of Examples 2 and 4 (comparative) were used to prepare, respectively, a first medium-voltage cable according to the invention and a second comparative medium-voltage cable. In particular, the compounds of Examples 3 and 4 were used to produce the insulating layer, while the compounds of Examples 1 and 2 were used to produce the inner and outer semiconductive layers.

The cables were prepared by extrusion, through a triple-head extruder, onto a 1/0 AWG conductor consisting of a cord of aluminium wires with a cross section of about 54 mm$^2$. The extruder, with an inside diameter of 100 mm, had the following temperature profile: from 140 to 210° C. in the cylinder, 230° C. on the collar and 235° C. at the head. The line speed was 2 m/min. The cables thus obtained had a 0.5 mm thick inner semiconductive layer, a 4.6 mm insulating layer and a 0.5 mm outer semiconductive layer.

From the insulating layer were obtained punch samples required to determine the mechanical properties according to CEI standard 20–34 § 5.1, using an Instron machine and a pulling speed equal to 50 mm/min. The results are given in Table 3.

As can clearly be seen from the data reported in Table 3, the insulating and semiconductive coatings on the cable according to the invention have E.B. and B.L. values which are significantly better than the comparative values.

TABLE 3

| Examples | 1 | 2(*) | 3 | 4(*) |
|---|---|---|---|---|
| Cop. 1 | 100 | — | 100 | — |
| Cop. 3 | — | 100 | — | 100 |
| Corax N550 | 20 | 20 | — | — |
| Conductex ® 975 | 25 | 25 | — | — |
| Irganox ® 1010 | 0.2 | 0.2 | 0.1 | 0.1 |
| Irganox ® PS802 | 0.4 | 0.4 | 0.2 | 0.2 |
| Mechanical properties of the plates | | | | |
| E.B. (%) | 595 | 222 | 733 | 104 |
| B.L. (MPa) | 14.4 | 7.3 | 23.2 | 8.0 |
| Mechanical properties of the 1/0 AWG cable | | | | |
| E.B. (%) | — | — | 521 | 316 |
| B.L. (MPa) | — | — | 18.4 | 9.3 |

(*)comparative
Corax N550: carbon black from Degussa (surface area 42 m$^2$/g - measured with nitrogen according to ASTM D 3765; iodine number = 43 mg/g according to ASTM D 1510);
Conductex ® 975: conductive carbon black from Columbia Chemicals (surface area 250 m$^2$/g - measured with nitrogen according to ASTM D 3765; iodine number = 247 mg/g according to ASTM D 1510);
Irganox ® PS802; distearyl thiopropionate (DSTDP)(antioxidant from Ciba Geigy);
Irganox ® 1010; pentaerythritil tetrakis[3-(3,5-di-tert-butyl-4-hydroxyphenyl)propionate](antioxidant from Ciba-Geigy).

What is claimed is:

1. A cable comprising a conductor and at least one coating layer based on a non-crosslinked polymer material comprising a thermoplastic reactor elastomer having an ethylene-based elastomeric phase copolymerized with an α-olefin and a propylene-based thermoplastic phase, wherein said elastomeric phase in said thermoplastic reactor elastomer is at least 45% by weight relative to the total weight of the thermoplastic reactor elastomer, and in that said thermoplastic reactor elastomer has a value of enthalpy of fusion of peaks present below 130° and attributable to polyethylene sequences lower than 3 J/g.

2. A cable according to claim 1, wherein at least 70% by weight of the non-crosslinked polymer material is said thermoplastic reactor elastomer.

3. A cable according to claim 1, when at least 90% by weight of the on-crosslinked polymer material is said thermoplastic reactor elastomer.

4. A cable according to claim 1, wherein in said thermoplastic reactor elastomer, the value of enthalpy of fusion of peaks present below 130° C. and attributable to polyethylene sequences is substantially zero.

5. A cable according to claim 1, wherein the elastomeric phase is an elastomeric copolymer of ethylene and propylene which comprises from 15 to 50% by weight of ethylene and from 50 to 85% by weight of propylene, relative to the weight of the elastomeric phase.

6. A cable according to claim 5, wherein the elastomeric phase is an elastomeric copolymer of ethylene and propylene which comprises from 20 to 40% by weight of ethylene and from 60 to 80% by weight of propylene, relative to the weight of the elastomeric phase.

7. A cable according to claim 1, wherein said thermoplastic reactor elastomer is mixed with a filler capable of imparting semiconductive properties.

8. A cable according to claim 7, wherein the filler is carbon black.

9. A cable comprising a conductor and at least one coating layer based on a non-crosslinked polymer material, wherein the non-crosslinked polymer material comprises a mixture of a thermoplastic reactor elastomer, as defined in any one of claims 1 to 5, with a thermoplastic polymer which has a melting point of greater than 160° C.

10. A cable according to claim 9, wherein the thermoplastic polymer is a crystalline propylene homopolymer or copolymer with an enthalpy of fusion greater than 75 J/g.

11. A cable according to claim 10, wherein the enthalpy of fusion of the thermoplastic polymer is greater than 85 J/g.

12. A cable according to claim 9, wherein the amount of thermoplastic polymer is from 10 to 50% by weight relative to the total weight of the mixture.

13. A cable according to claim 9, wherein the amount of thermoplastic polymer is from 20 to 40% by weight relative to the total weight of the mixture.

* * * * *

UNITED STATES PATENT AND TRADEMARK OFFICE
CERTIFICATE OF CORRECTION

PATENT NO. : 6,610,401 B2
DATED : August 26, 2003
INVENTOR(S) : Luca Castellani et al.

It is certified that error appears in the above-identified patent and that said Letters Patent is hereby corrected as shown below:

<u>Title page</u>,
Item [57], ABSTRACT,
Line 12, "has value" should read -- has a value --.

<u>Column 8</u>,
Line 49, "below 130º" should read -- below 130ºC --.
Line 55, "on-crosslinked" should read -- non-crosslinked --.

<u>Column 9</u>,
Line 13, "claims 1 to 5," should read -- claims 1 to 6, --.

<u>Column 10</u>,
Line 2, "homopolyer" should read -- homopolymer --.

Signed and Sealed this

Twenty-seventh Day of April, 2004

JON W. DUDAS
*Acting Director of the United States Patent and Trademark Office*